United States Patent
Chen

(10) Patent No.: US 11,590,619 B2
(45) Date of Patent: Feb. 28, 2023

(54) SCRAP REMOVING DEVICE FOR CUTTING WHEEL RIM

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

( * ) Notice: Subject to any disclaimer, the term of this patent is extended or adjusted under 35 U.S.C. 154(b) by 637 days.

(21) Appl. No.: 16/745,887

(22) Filed: Jan. 17, 2020

(65) Prior Publication Data

US 2021/0220955 A1  Jul. 22, 2021

(51) Int. Cl.
*B23Q 11/00* (2006.01)
*B08B 5/02* (2006.01)
*B23C 9/00* (2006.01)

(52) U.S. Cl.
CPC .............. *B23Q 11/005* (2013.01); *B08B 5/02* (2013.01); *B23C 9/00* (2013.01); *B23C 2230/00* (2013.01)

(58) Field of Classification Search
CPC .............. B23Q 11/005; B23Q 11/0075; B23Q 11/0042; B23C 9/00; B23C 2230/00; B08B 5/02; B23B 2270/30
See application file for complete search history.

(56) References Cited

U.S. PATENT DOCUMENTS

2018/0214916 A1\* 8/2018 Fukurotani ............... B08B 5/02

FOREIGN PATENT DOCUMENTS

| JP | H07100270 | B2 | \* | 11/1995 |
| KR | 200186070 | Y1 | \* | 6/2000 |
| KR | 20160042833 | A | \* | 4/2016 |

\* cited by examiner

*Primary Examiner* — Alan Snyder
(74) *Attorney, Agent, or Firm* — Rosenberg, Klein & Lee

(57) ABSTRACT

The present invention discloses a scrap removing device for cutting a wheel rim which comprises a main body having a working surface, a wheel rim positioning member, a first blowing member and a second blowing member sequentially disposed on the working surface from a top side thereof.

6 Claims, 4 Drawing Sheets

SCRAP REMOVING DEVICE FOR CUTTING WHEEL RIM

BACKGROUND OF THE INVENTION

1. Field of the Invention

The present invention relates to a scrap removing device for cutting a wheel rim which comprises a main body having a working surface, a wheel rim positioning member, a first blowing member and a second blowing member sequentially disposed on the working surface of the main body from a top side thereof for automatically removing scraps generated when cutting a wheel rim.

2. Description of Related Art

A conventional method for manufacturing a wheel rim made of aluminum alloy comprises the steps of pull-extruding an aluminum alloy material into an aluminum alloy long bar, rounding the aluminum alloy long bar into an aluminum alloy ring by a rolling machine, and cutting the aluminum alloy ring at an appropriate position to form a notch by a cutting machine in which two sides of the notch are defined as two connecting end surfaces for a wheel rim.

When the notch on the aluminum alloy ring is cut, scraps are generated and attached on the connecting end surfaces of the notch and fall into an interior hollow space of the aluminum alloy ring. The conventional method for removing scraps is blowing away the scraps by a worker using a blowout gas gun. High pressure air exported from the blowout gas gun blows the scraps attached on the connecting end surfaces or in the interior hollow space away from the aluminum alloy ring. However, the conventional method requires a lot of manpower and is time-consuming to completely remove the scraps, so it has increased production cost. In addition, workers removing scraps by the blowout gas gun may be accidently injured. If the workers are careless in operation, it may also cause incomplete removal of scraps and increases the defective rate of a product.

SUMMARY OF THE INVENTION

The present invention discloses a scrap removing device for cutting a wheel rim which comprises a main body having a working surface, a wheel rim positioning member, a first blowing member and a second blowing member sequentially disposed on the working surface of the main body from a top side thereof for automatically removing scraps generated when cutting a wheel rim.

The scrap removing device for cutting a wheel rim of the present invention comprises a main body having a working surface, a wheel rim positioning member, a first blowing member and a second blowing member sequentially disposed on the working surface from a top side thereof. In use of the present invention, plural semi-manufactured wheel rims are placed on the wheel rim positioning member and a notch of each of the plural semi-manufactured wheel rims is faced to the second blowing member. The second blowing member blows air into one end surfaces of the notch on the semi-manufactured wheel rim and scraps in the interior hollow space are blown out from the other end surface of the notch. Then, the first blowing member blows away the scraps for removing scraps from the other end surface of the notch. Furthermore, the scraps attached on the end surfaces of the notch of the semi-manufactured wheel rim are also blown away by the first blowing member. Accordingly, the present invention achieves a purpose of removing scraps on the semi-manufactured wheel rim automatically and completely.

DETAILED DESCRIPTION OF THE PREFERRED EMBODIMENT

Figure 1:
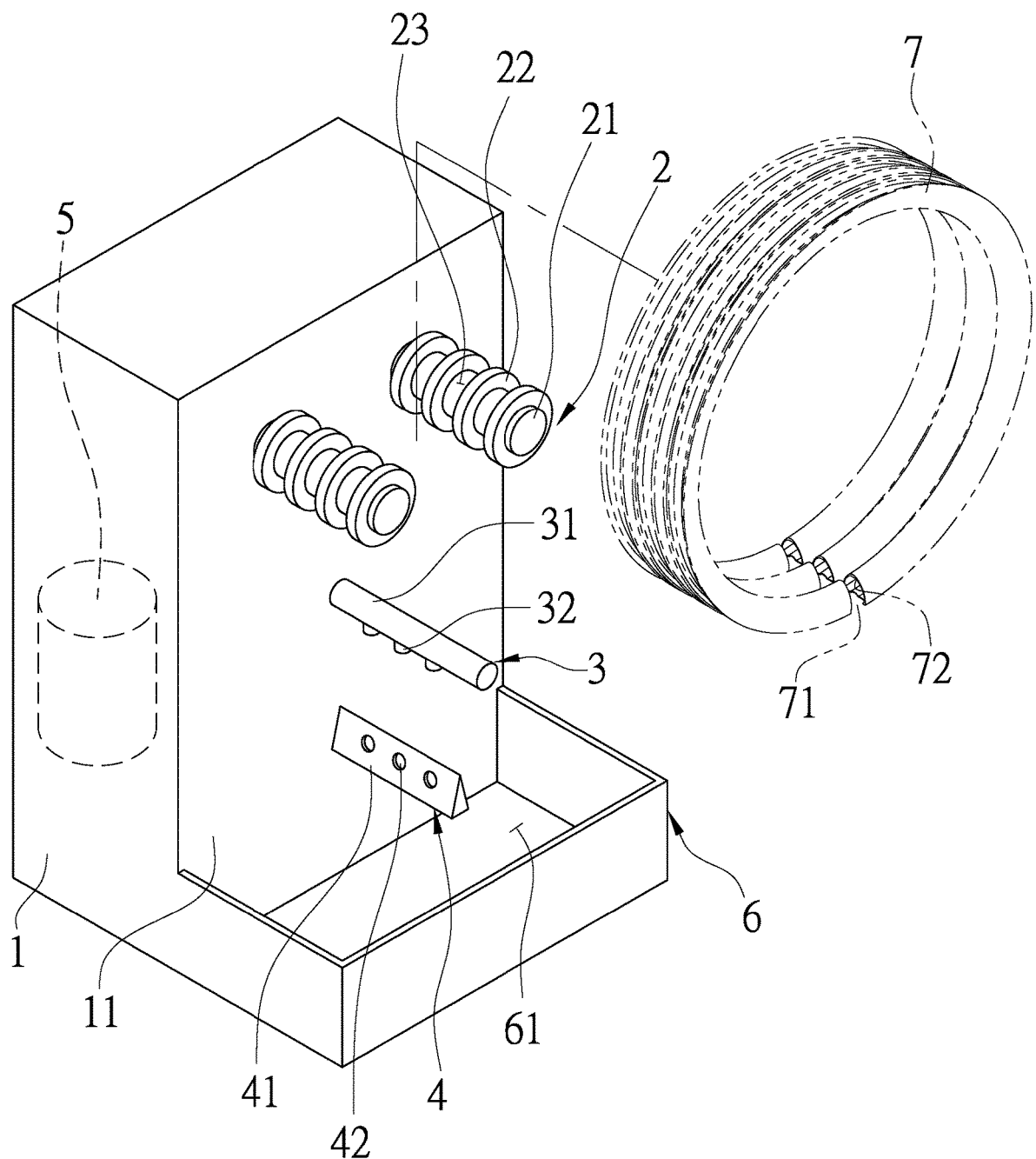
FIG. 1 is a stereogram showing a scrap removing device for cutting a wheel rim of the present invention.

Referring to FIG. 1, the scrap removing device for cutting a wheel rim comprises a main body (1), a wheel rim positioning member (2), a first blowing member (3), a second blowing member (4) and an air supply member (5).

The main body (1) comprises a working surface (11) and the wheel rim positioning member (2) is disposed on the working surface (11) of the main body (1). The wheel rim positioning member (2) comprises two cantilevers (21) arranged opposite to each other and each of the two cantilevers (21) has plural stop rings (22) and plural positioning intervals (23). Each of the plural positioning intervals (23) is defined by two adjacent stop rings (22), and the plural positioning intervals (23) of the two cantilevers (21) are corresponding to each other.

The first blowing member (3) is disposed on the working surface (11) of the main body (1) and below the wheel rim positioning member (2). The first blowing member (3) has a ventilation duct (31) and plural first air outlets (32). The ventilation duct (31) is disposed in a middle position below the two cantilevers (21), and the plural first air outlets (32) are disposed at a bottom side of the ventilation duct (31). The plural first air outlets (32) are arranged correspondingly to the plural positioning intervals (23) of the two cantilevers (21).

The second blowing member (4) is disposed on the working surface (11) of the main body (1) and below the first blowing member (3). The second blowing member (4) is provided with an air duct (41) disposed correspondingly below the ventilation duct (31) of the first blowing member (3), and the air duct (41) of the second blowing member (4) is shaped as a triangular air duct. The second blowing member (4) further comprises plural second air outlets (42) disposed on at least one lateral of the air duct (41). The plural second air outlets (42) are arranged correspondingly to the plural positioning intervals (23) of the two cantilevers (21).

The air supply member (5) is disposed in the main body (1) and can be an air compressor. The air supply member (5) is respectively communicated with the ventilation duct (31) of the first blowing member (3) and the air duct (41) of the second blowing member (4) by a pipeline.

The working surface (11) of the main body (1) is further provided with a collecting member (6) below the second blowing member (4), and the collecting member (6) can be a collecting tank (61) having an upward opening.

Figure 2:
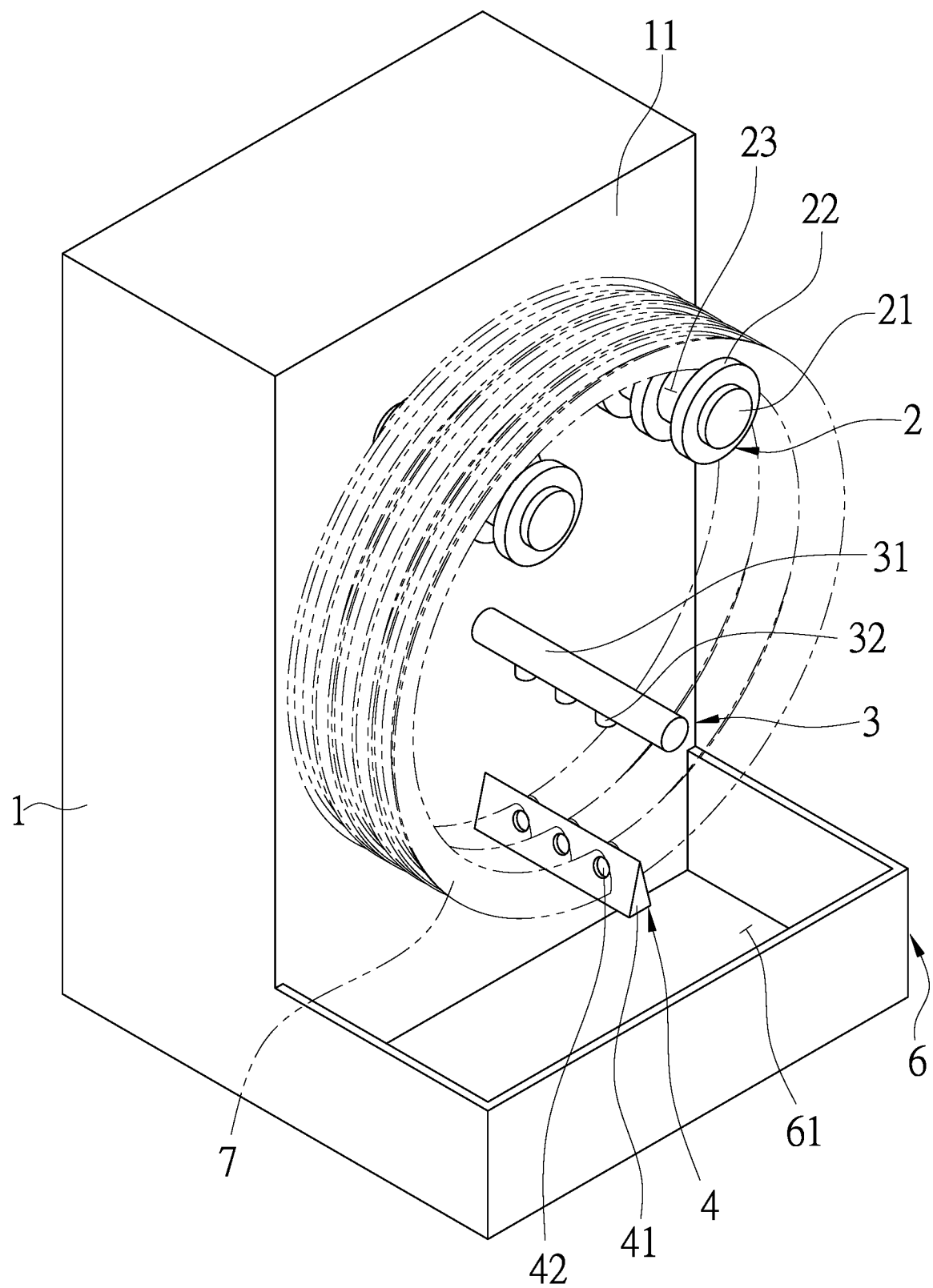
FIG. 2 is a stereogram showing a scrap removing device for cutting a wheel rim of the present invention in a working state.

Referring to FIG. 2, in use of the present invention, plural semi-manufactured wheel rims (7) each having a notch (71) cut by a cutting machine are disposed on the wheel rim positioning member (2). Each of the plural semi-manufactured wheel rims (7) is respectively hung on each of the plural positioning intervals (23) of the two cantilevers (21) of the wheel rim positioning member (2). In the meantime, the notch (71) of the semi-manufactured wheel rim (7) is faced to the air duct (41) of the second blowing member (4) and at least one opening of an interior hollow space (72) of the semi-manufactured wheel rim (7) is faced to the second air outlets (42) of the second blowing member (4).

Figure 3:
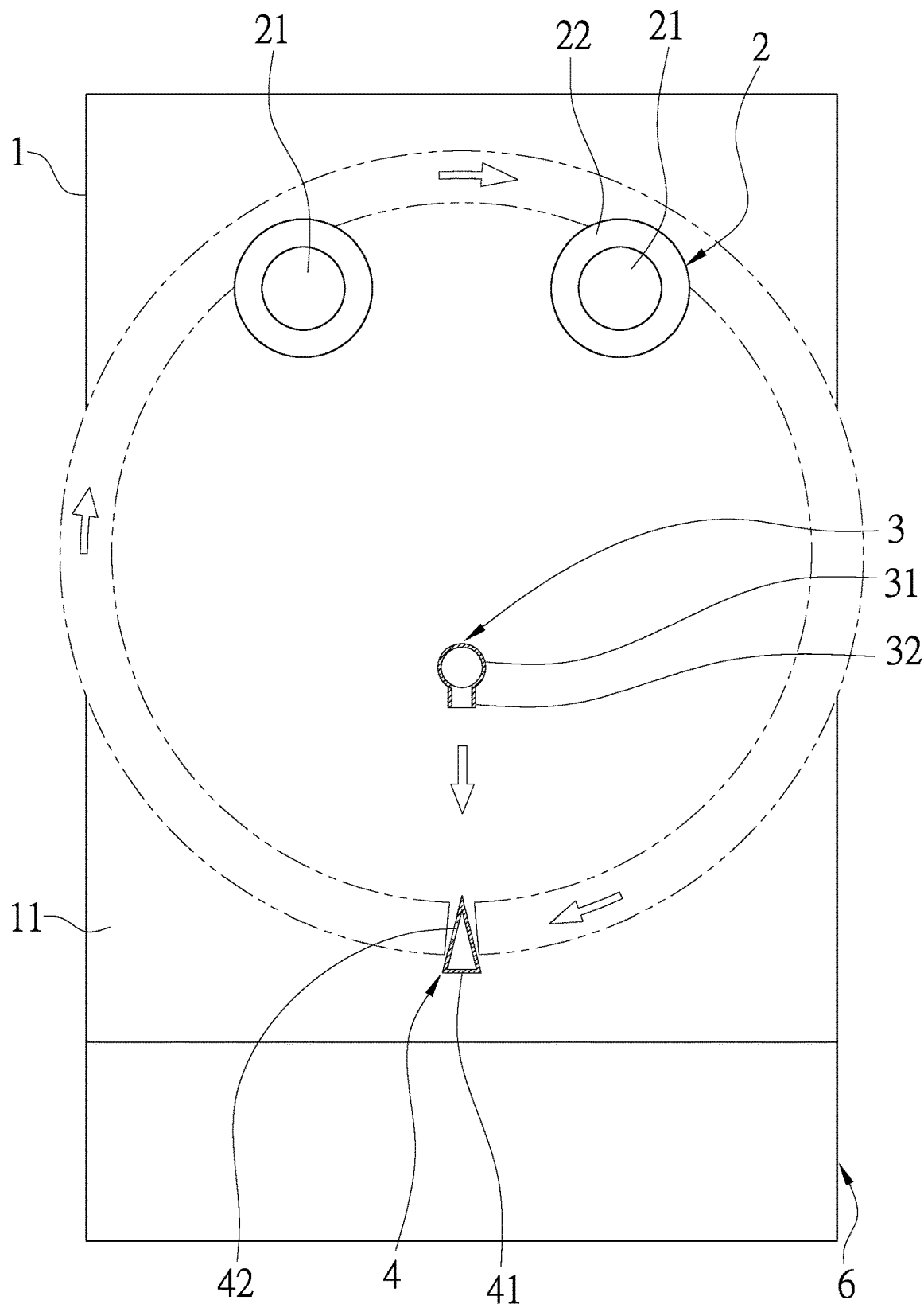
FIG. 3 is a front sectional diagram showing a scrap removing device for cutting a wheel rim of the present invention.
Figure 4:
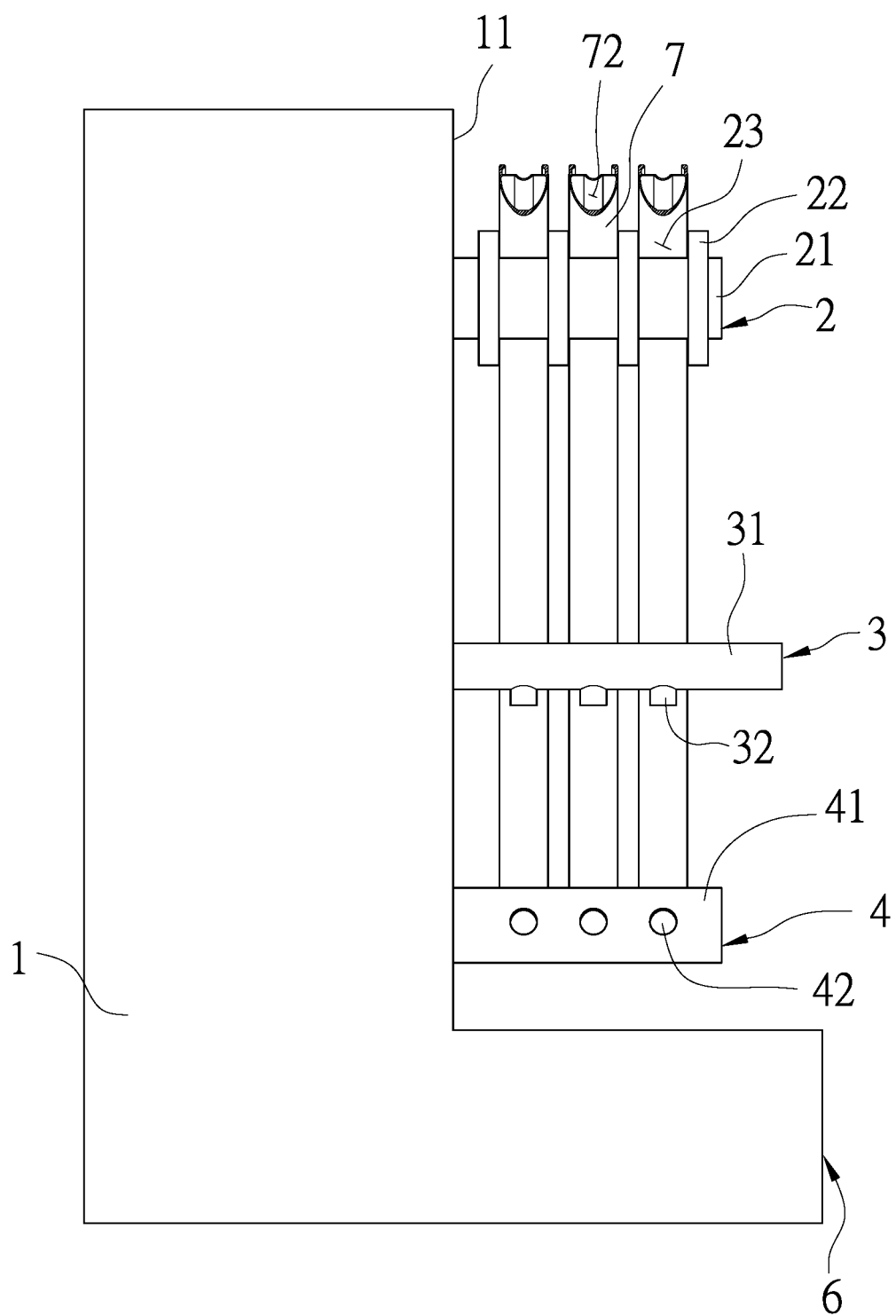
FIG. 4 is a side sectional diagram showing a scrap removing device for cutting a wheel rim of the present invention.

The air supply member (5) is then turned on to input high pressure air to the ventilation duct (31) of the first blowing member (3) and the air duct (41) of the second blowing member (4) by pipelines. Please referring to FIG. 3 and FIG. 4, the high pressure air input to the air duct (41) of the second blowing member (4) is ejected from each of the plural second air outlets (42) on the air duct (41). The ejected high pressure air is blown into the interior hollow space (72) of the semi-manufactured wheel rim (7) by a left opening thereof, and the scraps fall in the interior hollow space (72) is blown out and expelled from a right opening of the interior hollow space (72) of the semi-manufactured wheel rim (7). Accordingly, the scraps fall in the interior hollow space (72) of the semi-manufactured wheel rim (7) are removed effectively.

The high pressure air input to the ventilation duct (31) of the first blowing member (3) blows downwardly from the plural first air outlets (32) at a bottom of the ventilation duct (31) to blow away the scraps attached on two end surfaces of the notch (71) of the semi-manufactured wheel rim (7). Furthermore, scraps output from the right opening of the interior hollow space (72) of the semi-manufactured wheel rim (7) are also blown downwardly by the first blowing member (3). The scarps blown by the first blowing member (3) are collected by the collecting tank (61) of the collecting member (6) below the second blowing member (4).

Accordingly, the scrap removing device for cutting a wheel rim of the present invention removes scraps attached on the notch (71) and fallen in the interior hollow space (72) of the semi-manufactured wheel rim (7) automatically and completely, which saves manpower for removing scraps so as to reduce production cost. The present invention also prevents injuries of the workers when removing scraps of the semi-manufactured wheel rim (7) by using the blowout gas gun. Furthermore, the yield rate of the product is also increased since the present invention prevents incomplete removal of scraps by the workers careless in operation.

What is claimed is:

1. A scrap removing device for cutting a wheel rim, comprising:
    a main body having a working surface;
    a wheel rim positioning member disposed on the working surface and having two cantilevers arranged opposite to each other;
    a first blowing member disposed on the working surface of the main body and below the wheel rim positioning member and having a ventilation duct disposed in a middle position thereof and below the two cantilevers, and plural first air outlets at a bottom side of the ventilation duct;
    a second blowing member disposed on the working surface of the main body and below the first blowing member, wherein the second blowing member is provided with an air duct disposed correspondingly below the ventilation duct and plural second air outlets disposed on at least one lateral side of the air duct; and
    an air supply member disposed in the main body and respectively communicating with the ventilation duct of the first blowing member and the air duct of the second blowing member by a pipeline.

2. The scrap removing device for cutting a wheel rim as claimed in claim 1, wherein each of the two cantilevers of the wheel rim positioning member has plural stop rings and plural positioning intervals, each of which is defined by two adjacent stop rings, and wherein the plural positioning intervals of the two cantilevers correspond to each other.

3. The scrap removing device for cutting a wheel rim as claimed in claim 1, wherein the air duct of the second blowing member is shaped as a triangular air duct, and wherein the plural second air outlets disposed on the at least one lateral side of the triangular air duct are arranged correspondingly to the plural positioning intervals of the two cantilevers.

4. The scrap removing device for cutting a wheel rim as claimed in claim 1, wherein the working surface of the main body is provided with a collecting member below the second blowing member.

5. The scrap removing device for cutting a wheel rim as claimed in claim 4, wherein the collecting member is a collecting tank having an upward opening.

6. The scrap removing device for cutting a wheel rim as claimed in claim 1, wherein the air supply member is an air compressor.

* * * * *